United States Patent [19]

Cocco

[11] 4,335,948

[45] Jun. 22, 1982

[54] FILM RETRIEVER

[75] Inventor: Vincent L. Cocco, Wakefield, Mass.

[73] Assignee: Polaroid Corporation, Cambridge, Mass.

[21] Appl. No.: 251,142

[22] Filed: Apr. 6, 1981

[51] Int. Cl.³ .................... G03B 17/26; B25B 9/00
[52] U.S. Cl. ........................................ 354/275; 242/1
[58] Field of Search .................. 242/1, 71.1; 81/3 R; 354/275

[56] References Cited

U.S. PATENT DOCUMENTS

| | | | |
|---|---|---|---|
| 2,303,173 | 11/1942 | Roehrl | 242/71.1 |
| 3,261,237 | 7/1966 | Sentiff | 81/3 |
| 3,695,160 | 10/1972 | Stockdale | 95/31 CA |
| 3,705,696 | 12/1972 | Edwards et al. | 242/71.2 |
| 3,864,993 | 2/1975 | Hovind | 81/3 R |
| 4,047,653 | 9/1977 | Starr | 226/92 |
| 4,074,870 | 2/1978 | Kaufman | 242/1 |
| 4,138,068 | 2/1979 | Kinoshita | 242/1 |
| 4,145,133 | 3/1979 | Wareham | 354/275 |
| 4,212,527 | 7/1980 | Fischer | 354/275 |

*Primary Examiner*—Donald A. Griffin
*Attorney, Agent, or Firm*—Alfred E. Corrigan

[57] ABSTRACT

A photographic film assemblage including a film cassette having an exit through which a strip of film may be advanced, a spool rotatably mounted within the cassette, a strip of film coiled about the spool with a leading end thereof adapted to extend to the exterior of the cassette via the exit, and a strip of sheet material having an intermediate section, located between and in engagement with the outermost convolution of film and an interior wall of the cassette, and opposite ends which extend to the exterior of the cassette via the exit. Should the leading end of the film be located within the cassette, it may be removed by abruptly pulling one of the ends of the sheet material in a direction to cause its intermediate section to drag the leading end of the film through the exit.

8 Claims, 3 Drawing Figures

FILM RETRIEVER

BACKGROUND OF THE INVENTION

1. Field of the Invention

The invention relates to a photographic film assemblage having means for retrieving a leading end of a strip of film from within a film cassette.

2. Description of the Prior Art

The present invention relates to a photographic film assemblage of the type including a film cassette having an exit through which a leading end of a strip of film is adapted to extend to the exterior of the cassette and, more particularly, to such an assemblage which includes means for retrieving such leading end should it be inadvertently, or otherwise, moved to a position within the film cassette.

Among amateur and professional photographers, one of the most popular film formats in the 35 millimeter size. In the 35 millimeter system, the film is normally carried on a spool within a lighttight cylindrical cassette. The spool is driven at the end of the cassette and the film passes through an exit in the cylindrical wall of the cassette. The facing edges of the exit are provided with black plush to provide a light seal when nothing is passing through the exit. The light seal is improved further because the height of the exit is small to minimize light passage.

This system has the disadvantage that, when the cassette is to be removed from the camera, the film must be wound back into the cassette to avoid exposure to light. Most 35 millimeter cameras do not provide any accurate method of winding up the film without causing the end of the film (the leader) to pass through the exit into the cassette. Once the leader is in the cassette, it is very difficult to retrieve it in order to process the film or use any unexposed portions.

This loss of the leader occurs in two very different situations. When the roll of film is completely used, the film is wound back into the cassette, and it is desirable to have the leader available to remove the film from the cassette for processing. If the leader is not available, the cassette can be broken open to allow removal of the film. While this approach can be somewhat difficult and inconvenient for both the amateur and commercial processor, it is a variable solution. The leader is also lost in the suitation where the photographer has partially used a roll of film and desires to change to another type of film. The photographer must return the original film to the interior of the cassette; and, in doing so, the leader is often lost. If the photographer does not wish to waste the remainder of the original roll of film, he must somehow retrieve the leader. He may, of course, break open the cassette, which must be done in a dark room; but in the process, often ruins the cassette so that the film cannot be used without obtaining a new cassette.

Some have attempted to obviate this problem by preventing the end of the film from being fully rewound into the film cassette in the first place. For example, the film cartridges disclosed in U.S. Pat. Nos. 3,695,160 and 3,705,696 are each provided with a filmstrip having an integrally-molded projection, which is adapted to enter a perforation in the trailing end of a filmstrip to thereby preclude its entry into a take-up chamber. See also U.S. Pat. Nos. 4,145,133 and 4,212,527, wherein the leading end of a filmstrip is disfigured in a manner to preclude its entry into a film cassette. While these proposed solutions may have certain attributes, they are subject to the criticism that they may result in the filmstrip being torn, or otherwise damaged, if one were to continue to try to rewind the filmstrip after it had been stopped; and, such continued rewinding may damage the rewinding mechanism of the camera in which the film is located.

Others have recognized the value of being able to retrieve the leading end of the film without ruining the film, the cassette and/or the camera. For example, U.S. Pat. No. 3,261,237 describes a tool which can reach into the film cassette and retrieve the leading end of the film. U.S. Pat. Nos. 3,864,993 and 4,047,653 describe similar tools. However, these tools require proper manipulation and are subject to being misplaced in the workshop.

SUMMARY OF THE INVENTION

The instant invention relates to a photographic film assemblage, preferably of the type adapted for use in hand-held cameras of the 35 mm type and, more particularly, to such an assemblage which includes means for retrieving the leading end or leader of a filmstrip should it be located within the confines of a lighttight film cassette.

The photographic film assemblage includes a film cassette having a lighttight opening or exit therein through which a filmstrip is adapted to be advanced to the exterior of the film cassette, a spool or other such member supported therein for rotation about an axis generally parallel with the lighttight opening, and a filmstrip wound or coiled about the spool such that a leading end or leader thereof is adapted to extend to the exterior of the film cassette via the exit and a trailing end which is adapted to be secured to the spool.

As is well known in the art, the film cassette is adapted to be positioned within a film chamber in a camera and the film leader is attached to a take-up mechanism such that when the camera's loading door is closed, the take-up mechanism may be activated to move a first frame of the filmstrip into an exposure plane while simultaneously winding the leader about the take-up mechanism. After each photographic exposure of a frame, the take-up mechanism is activated to wind another length of film thereon thereby moving another frame of the filmstrip into position to be exposed. After the last frame has been exposed, a film rewind mechanism attached to the film spool drives the latter in a direction so as to rewind the filmstrip upon the spool. More often than not, this rewinding of the film results in the leading end or leader of the film being detached from the film take-up mechanism and moved into the interior of the film cassette. Accordingly, when the film cassette is removed from the camera, the filmstrip leader is not readily accessible thereby hindering the processing of the filmstrip or, if all of the frames were not exposed, the reloading of the film cassette into a camera. Therefore, the film assemblage further includes means for retrieving the leading end or leader of the film should it be located within the film cassette.

The means for retrieving the leader of the film comprises a strip of flexible material such as a sheet of paper having a width substantially equal to or less than the width of the filmstrip. This sheet material includes an intermediate section, which is adapted to be wound about the outermost convolution of film within the film cassette such that it is in engagement with the interior surface of the film cassette and the outwardly facing surface of the outermost convolution of film, and opposite ends which are adapted to extend to the exterior of the film cassette via the exit slot where they are wrapped in opposite directions around the exterior of the film cassette and secured to each other. So located, the sheet material does not interfere with the withdrawal of the filmstrip during exposure, nor its rewinding into the film cassette. However, if the leader of the filmstrip is moved to a position within the film cassette, the user merely has to detach one end of the sheet material from the other end and, while holding the cassette body with one hand, pull one of the ends of the sheet material with the other hand in a direction which will cause the intermediate section of the sheet material and the other end thereof to also be withdrawn from the cassette. This action results in the leader of the filmstrip being frictionally dragged along with the sheet material to the exterior of the film cassette as it, the sheet material, is being moved to the exterior of the film cassette.

An object of the invention is to provide a photographic film assemblage with means for retrieving a leading end of a filmstrip from within a 35 mm film cassette.

Another object of the invention is the provision of a film assemblage with a film retrieval member which is simple and inexpensive to manufacture.

Still another object of the invention is to provide a film assemblage with a film retrieval device which may be actuated in the ambient light.

Still another object of the invention is to provide a film assemblage with a film retrieval device which may also be used as an order form.

Other objects of the invention will in part be obvious and will in part appear hereinafter.

The invention accordingly comprises the photographic film assemblage possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
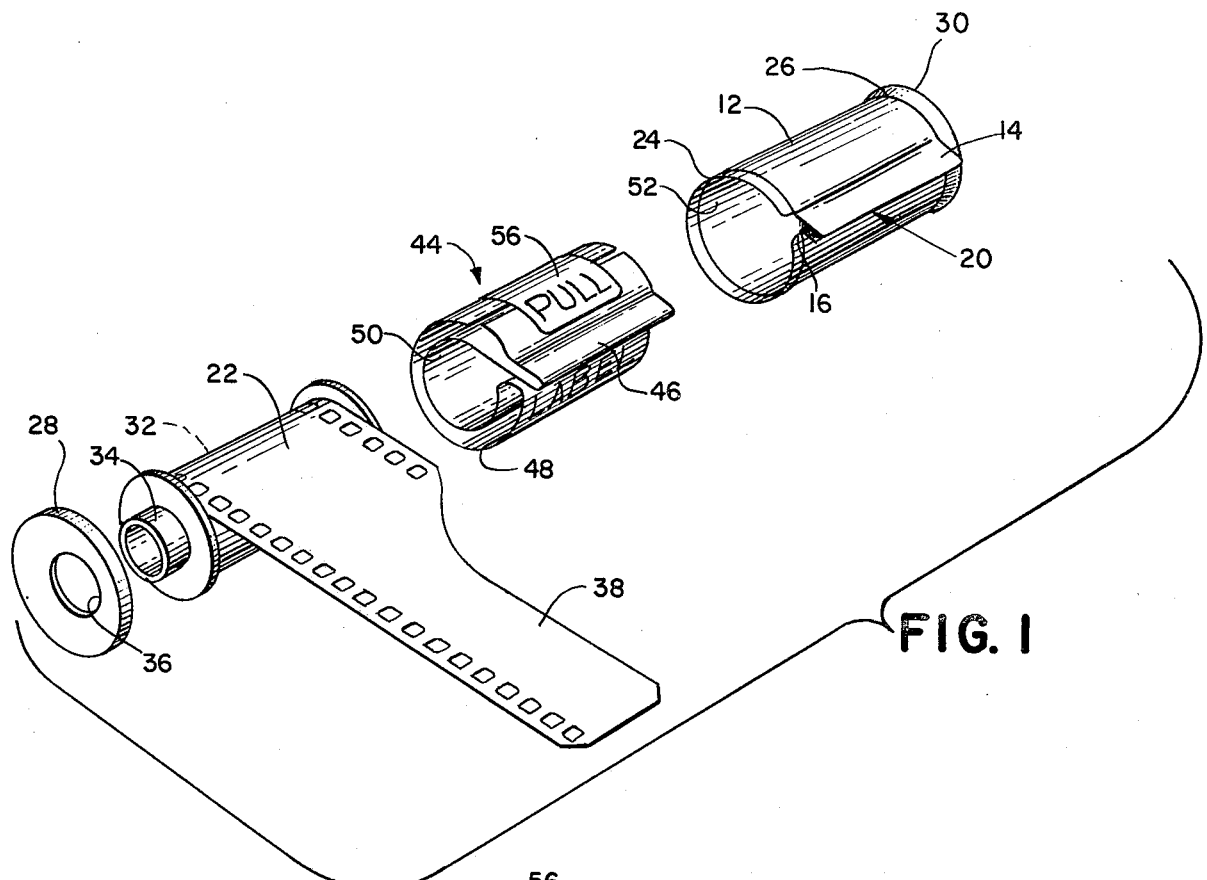
FIG. 1 is an exploded perspective view of a photographic film assemblage.

Reference is now made to the drawings wherein is shown a photographic film assemblage 10 which incorporates the instant invention. The film assemblage 10 includes a generally cylindrically-shaped film cassette 12 of the popular 35 mm configuration. The film cassette 12 is formed from any suitable opaque material and includes opposite ends 14 and 16 which, in combination with a suitable flocking 18, define a lighttight opening or exit 20 through which a filmstrip 22 is adapted to extend to the exterior of the film cassette 12. Opposite ends of the film cassette 12 are provided with circumferentially extending enlarged portions 24 and 26 which are adapted to releasably secure a pair of end caps 28 and 30 to the film cassette 12.

The photographic film assemblage 10 further includes a spool 32 having a journal 34 (only one being shown) at each longitudinal end which is adapted to be received by an aperture 36 (only one being shown) in each of the end caps 28 and 30 for rotatably supporting the spool 32 within the film cassette 12.

The strip of film or filmstrip 22 is adapted to be coiled about the spool 32 with a leading end or leader 38 thereof adapted to normally extend to the exterior of the film cassette 12 via the exit 20, and a trailing end 40 which is adapted to be secured to the spool 32 by any suitable means such as a strip of tape 42.

The photographic film assemblage 10, as described so far is conventional and is adapted to be located within a film chamber of a conventional 35 mm camera where the spool 32 is connected to a rewinding mechanism and the leading end 38 of the film 22 is releasably attached to a film advancing or take-up mechanism. After the camera has been secured against the ambient light, the individual frames in the film 22 are sequentially moved into an exposure position by the film advancing mechanism. After each exposure, the film advancing mechanism is again actuated to move another frame into position for exposure while simultaneously winding exposed portions of the film thereupon. After the filmstrip 22 has been completely exposed, or possibly only partially exposed, the film is rewound upon the spool 32 by actuating the camera's film rewinding mechanism. As mentioned hereinabove, more often than not, this rewinding of the film 22 into the film cassette 12 results in the leading end 38 of the film 22 being moved to a position within the film cassette 12. Accordingly, when the film cassette 12 is removed from the camera, the leading end 38 of the film 22 is not readily accessible thereby delaying the processing of the film; or, if all of the frames have not been exposed, the subsequent reloading of the film into the camera is greatly hindered.

Figure 2:
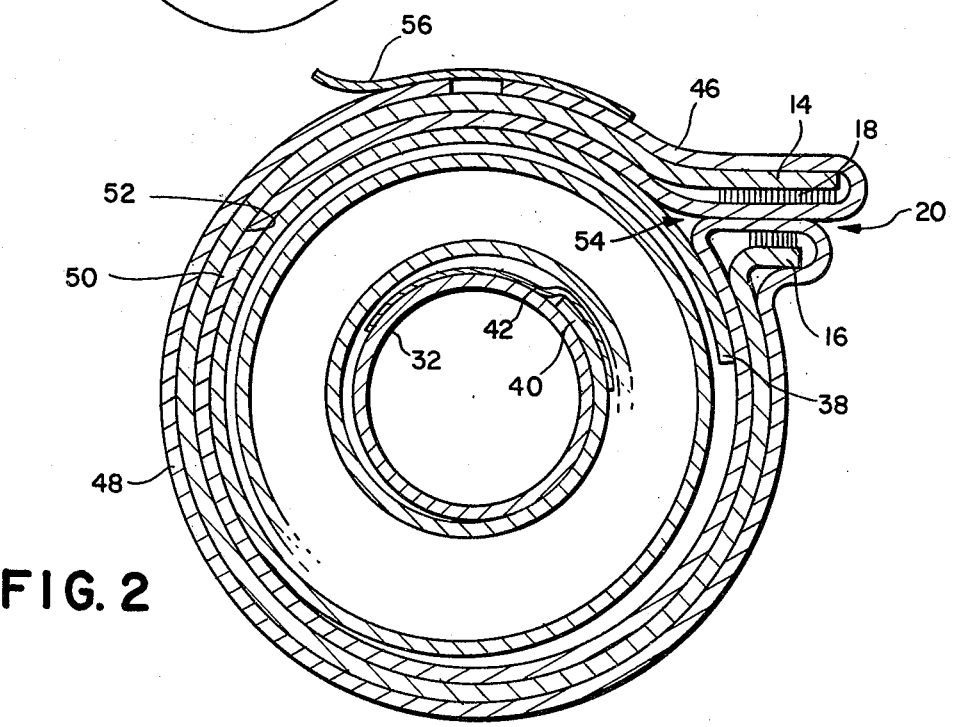
FIG. 2 is an enlarged end elevational view, partly in section, of the photographic film assemblage of the instant invention with a major length of a filmstrip being omitted for purposes of clarity.

In view of the foregoing, the film assemblage 10 is provided with a sheet of flexible material 44 which is adapted to function as a retriever for the leading end 38 of the film 22 and as a label or order form for ordering reproductions of the individual frames in the film 22. The sheet material 44 includes first and second opposite ends 46 and 48, respectively, and an intermediate section 50. The sheet material 44 is wound about the roll of film 22 such that the intermediate section 50 is located between and in engagement with an outwardly facing surface of the outermost convolution of the film 22 and an interior surface 52 of the film cassette 12 with the first and second ends 46 and 48 defining a converging passageway 54 as they enter the exit 20 prior to emerging from the film cassette 12 via the exit 20. As seen in FIG. 2, the first and second ends 46 and 48 are then wrapped in opposite directions about the film cassette 12 to a point whereat they are releasably secured to each other by a pull tab 56, which may be a separate piece, as shown, or may be an extension of the first or second ends.

FIG. 2 illustrates a condition wherein the leading end 38 of the film 22 is located within the film cassette 12. The leading end may be readily moved to the exterior of the film cassette 12 by detaching the pull tab 56 from the second end 48 of the sheet material 44 thereby allowing the second end 48 to move out of covering relation with the exterior surface of the film cassette 12.

Figure 3:
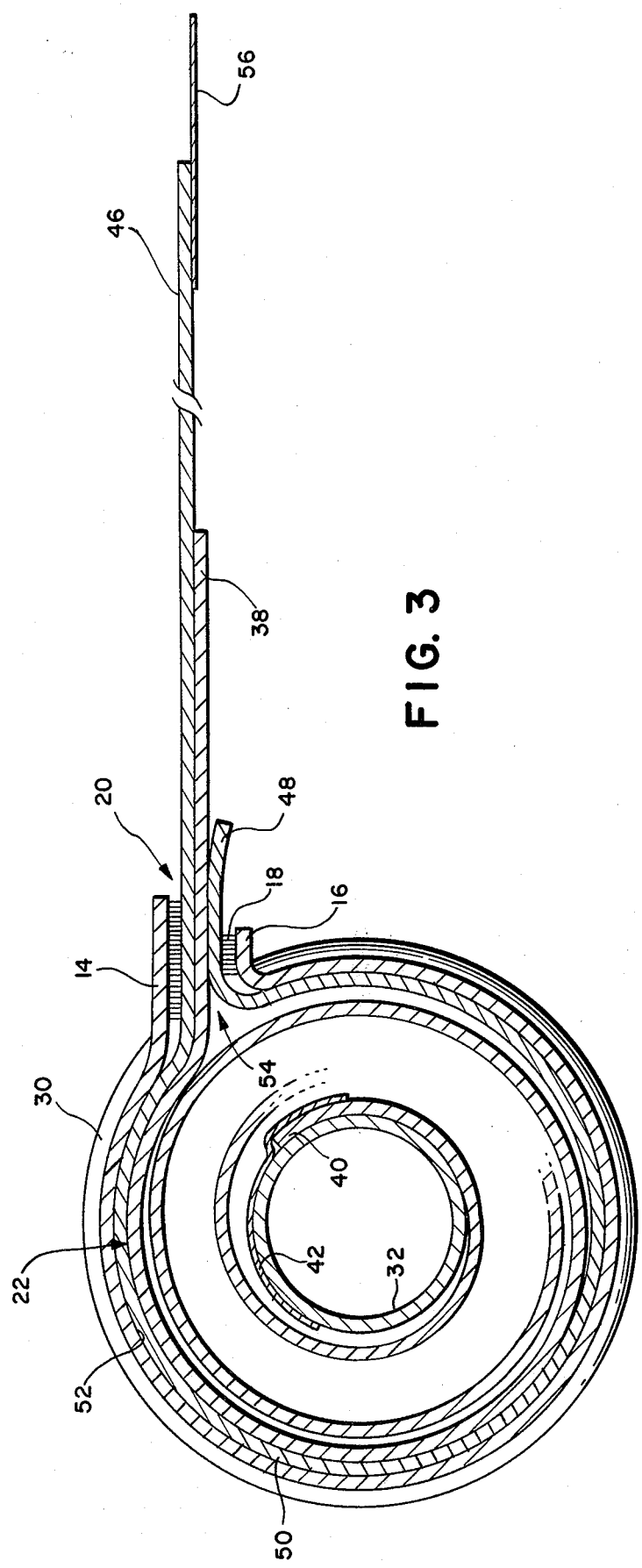
FIG. 3 is a view similar to FIG. 2 which depicts the relationship between an end of a filmstrip and a film retriever as the latter is being withdrawn from a film cassette.

Now, while holding the film cassette 12 with one hand, the first end 46 abruptly is pulled by the other hand toward the right, as viewed in FIG. 3. This action results in the intermediate section 50 of the sheet material 44 being rapidly withdrawn from the film cassette 12 as the second end 48 is first drawn into the film cassette 12 and then finally withdrawn from the film cassette. This movement of the sheet material 44 is at least partially transferred to the leading end 38 of the film 22 via the frictional engagement therebetween so as to move it in a clockwise direction until it reaches the converging passageway 54 whereat the film's inherent unwinding characteristic allows it to follow the sheet material 44 as it moves through the exit 20, as best seen in FIG. 3.

Preferably, the sheet material 44 is a strip of opaque, carbon black impregnated forty-five pound paper. One side of the paper is preferably treated so as to give it a coefficient of friction which is less than the opposite side of the paper. When assembled, the treated side of the paper is located in engagement with the interior surface 32 of the film cassette 12 thereby decreasing the friction therebetween during movement of the sheet material 44. The sheet material 44 is preferably impregnated with carbon black to reduce its propensity to build up a static charge, which charge if released may fog the photosensitive layer of the film 22.

Since certain changes may be made in the abovedescribed photographic film assemblage without departing from the scope of the invention herein involved, it is intended that all matter contained in the above description or shown in the accompanying drawings shall be interpreted as illustrative and not in a limiting sense.

What is claimed is:

1. A photographic film assemblage comprising:
   a film cassette including means defining an exit through which a strip of film may pass to the exterior of said film cassette;
   means for supporting a strip of film, said supporting means being rotatably supported within said film cassette;
   a strip of film coiled about said supporting means, said film including a leading end which is adapted to extend to the exterior of said film cassette via said exit and a trailing end secured to said supporting means; and
   means for retrieving said leading end of said film from within said film cassette, said retrieving means including a strip of flexible sheet material having first and second opposite ends and an intermediate section therebetween, said sheet material being wound about said film such that said intermediate section is located between and in engagement with an outwardly facing surface of the outermost convolution of said film and an interior surface of said film cassette with said first and second ends thereof extending through said exit to the exterior of said film cassette, whereby movement of said leading end of said film from within said film cassette may be accomplished by pulling said first end of said sheet material in a manner so as to withdraw said intermediate section of said sheet material from film cassette.

2. A photographic film assemblage as defined in claim 1 wherein said first and second ends of said sheet material extend around the perimeter of said film cassette to a point whereat they are releasably secured to each other.

3. A photographic film assemblage as defined in claim 1 wherein the surface of said intermediate section in contact with the interior surface of said film cassette has a coefficient of friction less than the surface of said intermediate section which is in engagement with said outer convolution of film.

4. A photographic film assemblage as defined in claim 1 wherein said first and second ends of said sheet material form a passageway having converging walls as they enter said exit to thereby facilitate the introduction of said leading end of said film into said passageway.

5. A photographic film assemblage as defined in claim 1 wherein said sheet material includes means for reducing the propensity of said sheet material to build up a static charge.

6. A photographic film assemblage as defined in claim 5 wherein said means for reducing the propensity of said sheet material to build up a static charge includes carbon black.

7. A photographic film assemblage as defined in claim 6 wherein said sheet material is paper.

8. A photographic film assemblage as defined in claim 1 wherein said sheet material includes indicia thereon which relates to said film.

* * * * *